United States Patent
Yamanaka et al.

(10) Patent No.: US 9,920,707 B2
(45) Date of Patent: Mar. 20, 2018

(54) CONTAINER UNIT-TYPE ENGINE GENERATOR DEVICE HAVING PIPE COUPLING FUNCTION

(71) Applicant: Mitsubishi Heavy Industries, Ltd., Tokyo (JP)

(72) Inventors: Tomokazu Yamanaka, Tokyo (JP); Takuya Hirai, Tokyo (JP); Shuichi Shimodaira, Kanagawa (JP); Hirokazu Narita, Kanagawa (JP); Takeshi Abe, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 311 days.

(21) Appl. No.: 14/440,069

(22) PCT Filed: Dec. 28, 2012

(86) PCT No.: PCT/JP2012/084200
§ 371 (c)(1),
(2) Date: Apr. 30, 2015

(87) PCT Pub. No.: WO2014/103059
PCT Pub. Date: Jul. 3, 2014

(65) Prior Publication Data
US 2015/0300291 A1    Oct. 22, 2015

(51) Int. Cl.
*F02G 5/02* (2006.01)
*F02B 63/04* (2006.01)

(52) U.S. Cl.
CPC .............. *F02G 5/02* (2013.01); *F02B 63/044* (2013.01); *Y02E 20/14* (2013.01); *Y02T 10/166* (2013.01)

(58) Field of Classification Search
CPC .......... F02G 5/02; F02B 63/04; F02B 63/044; F02B 65/00; B65D 88/00
See application file for complete search history.

(56) References Cited

U.S. PATENT DOCUMENTS 3,382,157 A * 5/1968 Barnstead ............... C02F 1/045
                                                                159/31
4,657,290 A * 4/1987 Linden .................... F02B 63/04
                                                                290/2

(Continued)

FOREIGN PATENT DOCUMENTS

CN    101117925    2/2008
CN    202243123    5/2012
(Continued)

OTHER PUBLICATIONS

Notification Concerning Transmittal of International Preliminary Report on Patentability, App. No. PCT/JP2012/084200, Filed Dec. 28, 2012, dated Jul. 9, 2015, 10 Pages.

(Continued)

*Primary Examiner* — Mark Laurenzi
*Assistant Examiner* — Shafiq Mian
(74) *Attorney, Agent, or Firm* — Berkeley Law & Technology Group, LLP

(57) ABSTRACT

The container unit type cogeneration engine generator comprises a long generator container in which an engine and components on a generator main body side including a generator driven by the engine are accommodated, and a short exhaust heat utilizing container in which a boiler that generates steam and hot water for hot-water supply by utilizing exhaust heat of the engine and an exhaust heat utilizing apparatus including a heat exchanger are accommodated. A combination container unit is configured so that shorter walls on one end side of the both containers in a longer direction are positioned on a same straight line, and making both longer walls of the long generator container and the short exhaust heat utilizing container to face each other. Both containers are coupled with a plurality of pipes (Continued)

along the shorter direction of the containers across the facing walls along which the both containers are arranged.

6 Claims, 8 Drawing Sheets

(56) References Cited

U.S. PATENT DOCUMENTS

| | | | | |
|---|---|---|---|---|
| 4,992,669 | A * | 2/1991 | Parmley | F01B 1/12 |
| | | | | 123/2 |
| 5,719,990 | A * | 2/1998 | Yang | F24D 17/001 |
| | | | | 290/2 |
| 6,441,505 | B1 * | 8/2002 | Poletti | F02B 63/04 |
| | | | | 123/350 |
| 8,336,311 | B2 * | 12/2012 | Ogino | F01D 15/10 |
| | | | | 60/670 |
| 8,816,518 | B2 * | 8/2014 | Campion | F02B 63/04 |
| | | | | 290/1 A |
| 2003/0033994 | A1 * | 2/2003 | Campion | F02B 63/04 |
| | | | | 123/41.56 |
| 2004/0104577 | A1 * | 6/2004 | Alger | F02B 63/04 |
| | | | | 290/1 A |
| 2008/0023962 | A1 * | 1/2008 | Cho | B60H 1/00421 |
| | | | | 290/2 |
| 2008/0034729 | A1 * | 2/2008 | Tafas | F01K 23/065 |
| | | | | 60/39.182 |
| 2008/0284177 | A1 | 11/2008 | Auer | |
| 2010/0060016 | A1 * | 3/2010 | Hunter | F02D 29/06 |
| | | | | 290/1 R |
| 2010/0060093 | A1 * | 3/2010 | Hunter | B60L 8/003 |
| | | | | 310/89 |
| 2012/0098260 | A1 | 4/2012 | Ichikawa | |

FOREIGN PATENT DOCUMENTS

| | | |
|---|---|---|
| CN | 104736827 | 6/2015 |
| EP | 1426307 | 6/2004 |
| JP | 5622556 A | 3/1981 |
| JP | H4156250 | 5/1992 |
| JP | 5296008 A | 11/1993 |
| JP | H7232879 | 9/1995 |
| JP | 2004263589 A | 9/2004 |
| JP | 2005042600 A | 2/2005 |
| JP | 2005076592 A | 3/2005 |
| JP | 3847059 | 11/2006 |
| JP | 2008247567 | 10/2008 |
| JP | 2008247576 A | 10/2008 |
| JP | 2014016124 A | 1/2014 |
| RU | 50256 U1 | 12/2005 |
| RU | 2340785 C1 | 12/2008 |
| WO | 2014103059 A1 | 7/2014 |

OTHER PUBLICATIONS

Decision to Grant, Japanese App. No. JP2014-554040, Drafting Date Mar. 17, 2016, dated Mar. 25, 2016, 6 Pages.
Decision on Grant, App. No. 2015116624/20(025837), Filed Dec. 28, 2012, 14 Pages.
Notification of Receipt of Record Copy, App. No. PCT/JP2012/084200, Filed Dec. 28, 2012, dated Jan. 22, 2013, 1 Page.
International Search Report, App. No. PCT/JP2012/084200, Filed Dec. 28, 2012, dated Feb. 5, 2013, 4 Pages.
EP12891127/PCT/WO2012JP84200/2910764 Supplemental European Search Report, dated Oct. 23, 2015.
CN104736827/201280076598: First Office Action, English translation, dated Oct. 10, 2015.

* cited by examiner

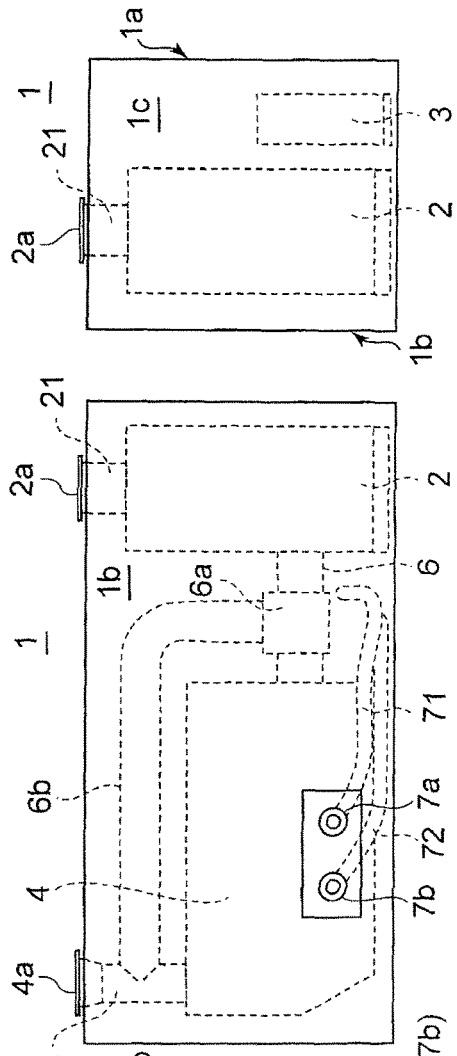
FIG.2(D)
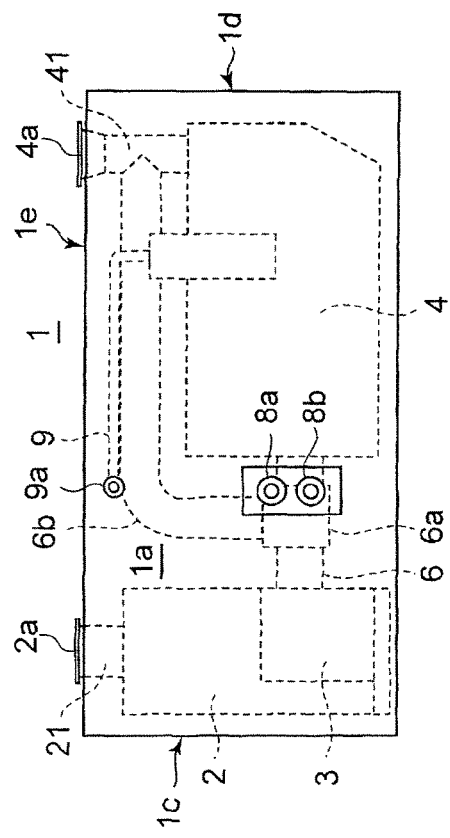
FIG.2(B)
FIG.2(A)
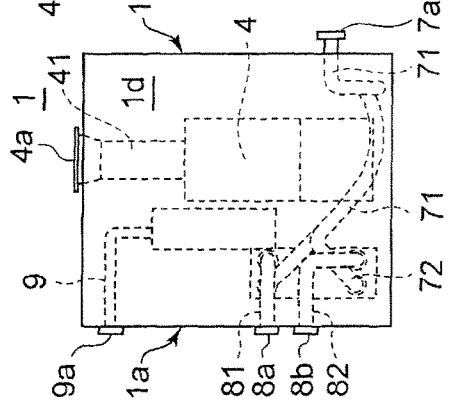
FIG.2(C)

CONTAINER UNIT-TYPE ENGINE GENERATOR DEVICE HAVING PIPE COUPLING FUNCTION

TECHNICAL FIELD

The present invention relates to container unit type cogeneration-using engine generator devices, more particularly relates to a container unit type engine generator devices, each having a pipe coupling function, each composed of a combination of a long generator container in which components on a generator main body side including an engine and a generator driven by the engine are accommodated, and a short exhaust heat utilization container in which an exhaust heat utilization apparatus including a boiler that generates steam and hot water for hot-water supply by using exhaust heat of the engine and a heat exchanger is accommodated.

BACKGROUND

Conventionally, engine generator devices each including an engine and a generator driven by the engine are well known. Demand for such engine generator devices is increasing in emerging countries, from a point in which such engine generator devices may be easily installed to cope with a lack of normal commercial power supplies and an increase in electric load, and because the engine generator devices, as being decentralized generator devices, do not require a transmission and distribution grid. Further, also in advanced countries, also from a necessity of coping with needs of emergency power at a time of disaster, it is possible to transport individual parts to respective sites where generation power is required, to assemble at each site, and to make a completed product only by plumbing respective parts. Therefore, demands for decentralized power supplies of on-site assembling type, especially, of middle-sized have been increased.

However, as demands for decentralized middle-sized engine generator power supplies have been increased, even when main components of these engines, generators, and such are unitized, since these have to be transported to a site and coupling of the unitized engines and generators, connections of pipes, and such have to be carried out on site, and, when adjustments are made for each coupled unit on site, time and skills are required for the assemblies and adjustments.

Even when main components are unitized as described above, since they are middle-sized generators, it takes a certain number of days for the assemblies and adjustments. Therefore, it does not meet an urgent demand at a time of a disaster such as in a case where electric power was urgently required for the last nuclear accident.

Even when main components are unitized, since connections of pipes and cables are required between units, it is required to save an installation space by reducing routings of pipes and cables and such as much as possible at a time of assembly. Since performance adjustments were made on site after assembly, even when main components were unitized, performance adjustments of a completed engine generator device could not also be stably made due to variations in skills of workers on site.

For eliminating such drawbacks, a technology of eliminating needs for assemblies and performance adjustments on site by using containers used for ocean transportation, land transportation, and air transportation and mounting an engine generator device as it is in the container, in other words, a container handling device in a container of which an engine equipped with a cooling fan on a front side, a generator driven by the engine on a rear side of the engine, and such are arranged in series is disclosed (the prior art of Patent Document 1)

Generally, sizes of containers that are transported by mounting on a ship, a truck, and such are commonalized. According to standards specified by the ISO standard, lengths of the container are only two kinds, which are 20 f (6 m) and 40 f (12 m) (although a container of a length of 45 f is standardized, it may not be transported under the current Road Traffic Law in Japan). A width and a height of a container are unified to be 8 f (2.4 m) and 8.6 f (2.6 m), respectively. Therefore, in a case of containers of standards that may be transported on Japanese public roads, even when a 40 f (12 m) container is used, although it is long in a longer direction, a width and a height are set to be 8 f (2.4 m) and 8.6 f (2.6 m), respectively, which are narrow so that a truck on which such a container is mounted may run on public roads.

Therefore, as is similar to Patent Document 1, it is required to make a disposition space of an engine as large as possible by arranging in series in the longer direction of a container each unit of an engine, generator, and other units (a wind-power generation unit in Cited document 1). However, as is similar to Patent Document 1, since, when the engine, the generator, and other units are arranged in series in this order, a weight of the engine is relatively heavier than the other units, the center of gravity of the container is decentered to a front side of the container with the arrangement configuration, the possibility that the container is inclined when the container is hoisted up by a crane and such or a freak accident occurs is increased.

When a configuration in which a plurality of units including an engine is accommodated in one container is adopted, since an exhaust gas has to be exhausted to the outside of the engine, the container becomes a configuration in which a muffler is mounted on an upper wall of the container above the engine as illustrated in Patent Document 1 and such configuration leads to making a height of an entire container higher than the standard, a truck on which the container is mounted becomes incapable of running on public roads. Therefore, although it is general to adopt a configuration in which a muffler is detachable from the container or a muffler is mounted at a time of assembly on site, such a configuration not only increases assembly man-hour on site but also tends to bring about an environmental problem from vibrations and a thermal effect caused by the muffler being exposed and protruded to the outside.

On the other hand, even when an engine generator device, for instance, uses a highly efficient gas engine, it uses a fossil fuel, namely a natural gas. From a view point of energy saving and $CO_2$ saving, a study is required of design and development of a cogeneration type generator that effectively utilizes an exhaust gas of an engine and exhaust heat of cooling water. Therefore, for the conventional engine generators, a lot of engine generators with cogeneration have been developed each of which positively utilizes exhaust heat of an engine and obtains steam heat by heat exchange between an exhaust gas and a boiler, and obtains hot water for hot-water supply by exchanging heat between clear water and heated cooling water used for cooling the engine (refer to Patent Document 2 and such).

CITATION LIST

Patent Literature

[Patent Document 1] JPA2008-247576
[Patent Document 2] JPA2004-263589

SUMMARY

Technical Problem

However, even for a long 40 f container long in the longer direction of the container, to accommodate not only an engine, a generator, but also a heat exchanger for hot water generation and a boiler for steam generation, an arrangement space for the engine has to be downsized by that amount, and, as a result, a rating has to become smaller compared to a container space. Therefore, to arrange in the longer direction a number of units such as not only an engine and a generator but also a boiler and a heat exchanger in one container, even when such units may be arranged, each unit becomes small, the number of containers required to obtain required power output is uselessly increased, and a problem arises also in terms of cost saving and space saving.

The inventor of the present invention provides in simultaneously applied international patent applications (reference numbers 12-806PCT and 12-808PCT) a container unit type cogeneration-using engine generator device of a coupling arrangement that accommodates an original power generation function part that functions as an engine generator including an engine and a generator driven by the engine in one long container, particularly a 40 f container, obtains a long container on which a middle-sized power supply device having a required output is mounted without uselessly lowering a rating of the engine, accommodates a boiler utilizing exhaust heat of the engine and a heat exchanger in another short exhaust heat utilizing container, preferably a short exhaust heat utilizing container whose length is half of the 40 f container to effectively utilize the container, couples the two containers, is space saving, and has excellent maintainability also after the assembly.

However, when a configuration is adopted in which a long container in which an engine and a radiator are accommodated and a short container in which a boiler and a heat exchanger that obtain the heat are accommodated are adjacently arranged in parallel with a longer direction, and heat (exhaust gas heat and heated engine cooling water) on a long generator container side is supplied to the boiler and the heat exchanger on a short exhaust heat utilizing container side to transfer to an exhaust heat recovery side, and when not only a coupling pipe of cooling water but also a muffler that is a silencer of the exhaust gas of the engine are accommodated in a short container side, pipes for connecting both containers are required, and connection tolerances for accurately connecting the pipes have to be securely maintained.

Since the long generator container and the short exhaust heat utilizing container are assembled respectively at separate places, variations in assembly positions of the unit and pipes thereof occur, facing surfaces of both the containers entend in the longer direction of the containers, and connection positions of the pipes are located in the shorter direction perpendicular to the longer direction of the containers, not only couplings of the pipes but also the various kinds of units may not be accurately assembled unless reference positions are communalized.

The present invention is to provide a container unit type cogeneration-using engine generator device, while making a long generator container in which a power generation function part is accommodated to be a basic container configuration, capable of, as an option, when short exhaust heat utilizing containers that are shorter than the long generator container are individually manufactured, accurately coupling pipe systems of both containers.

Solution to Problem

The present invention is to provide a container unit that is, for solving such a problem, composed of a generator container including an engine and a generator, and an exhaust heat utilizing container that generates steam or hot water by recovering exhaust heat of the engine, and is configured by arranging in parallel with a longer direction of the respective containers, making longer walls of both the containers to face each other, and coupling both the containers with a plurality of pipes between the facing positions.

According to the invention, while making a long generator container in which a power generation function part is accommodated to be a basic container configuration, capable of, as an option, when short exhaust heat utilizing containers that are shorter than the long generator container are individually manufactured, easily installing both containers while saving space, and accurately coupling pipe systems coupled between both containers.

Preferably, a combination container unit is configured by disposing so that shorter walls on one end side of both the containers in a longer direction are respectively positioned on a same straight line, and making both longer walls of the long generator container and the short exhaust heat utilizing container to face each other and arranging the respective containers in parallel with longer direction across the facing walls by making the reference surface as a reference.

According to the invention, shorter walls on one end side of the respective containers in a longer direction are respectively positioned on the same straight line. Thereby, space may be saved and, since distances from the short walls to pipe take-out ports coincide, positioning of pipes may be facilitated.

Since, by making a 0 f surface that is a short wall on one end side in a longer direction to be a reference surface, a 20 f container that is for instance a short exhaust heat utilizing container and a 40 f container that is a long generation container are brought in contact with the reference surface, in the long generation container, in disposition positioning of a heated cooling water outlet and return pipes on an engine side or positioning of various kinds of pipes on a radiator side, a distance from the reference surface provided on the 0 f side may be uniquely determined. In other words, since the pipes may be provided perpendicularly to a shorter direction, distance setting with rigorous tolerances becomes easy.

Similarly, in a short exhaust heat utilizing container, in positioning of heated cooling water inlet port and return port on a boiler side that are coupled to the heated cooling water outlet and return pipes, since a distance from the reference surface provided on the 0 f side may be uniquely determined, in other words, the pipes may be provided perpendicularly to a shorter direction, distance setting with rigorous tolerance becomes easy.

Although lengths in the longer direction of the 0 f shorter wall of the long generator container and the short exhaust heat utilizing container are different, since respective 0 f short walls both constitute a common linear reference surface, the heated cooling water outlet port on the engine side of the generator container side, the cooling water inlet port on the exhaust heat utilizing container side, and axis lines of return pipes of the respective containers are all become axis lines parallel to the reference surface (lines parallel to the shorter direction perpendicular to the longer direction), coupling of pipes between both the containers becomes easy.

In other words, since tolerances of distances of dispose positions of the pipes of both the containers from the reference surface are rigorously set, even when coupling between both the containers across the facing walls of both the containers with a plurality of pipes along the shorter direction of the containers, the coupling may be accurately performed.

By collectively disposing the respective outlet port and the inlet port in one position, workability is improved.

Since the containers are of the sizes specified by ISO, when the reference surface is set at the shorter walls of container walls, the other end sides of the shorter walls of the containers are formed in the standard sizes.

Therefore, since the reference surface is always rigorously positioned at 0 f and, on the other hand, the other end sides of the reference surface are regulated by length sizes of 20 f and 40 f, both the 40 f end side on the generator container side and the 20 f end side on the exhaust heat utilizing container side are positioned in high tolerance accuracy as long as they are in the longer direction of the containers.

Therefore, by configuring so as to be composed of a long generator container in which a radiator, an engine, a generator, and a control panel of the generator are accommodated and arranged in series along the longer direction of the container from the reference surface side, and a short exhaust heat utilizing container formed by disposing a boiler on the reference surface side along the longer direction of the container, and disposing side by side on both sides of the shorter direction on the far side a muffler for attenuating sound of an exhaust gas and a heat exchanger for generating hot water by exchanging heat with heated cooling water of the engine, in the long generator container, excellent mounting accuracies may be maintained in the longer direction from the reference surface when the radiator and the engine are assembled from the reference surface on the 0 f side, and also on the 40 f side that is the opposite side of the reference surface, since the size is accurately regulated by the container, the generator and the control panel side may be accurately assembled.

Also, the short exhaust heat utilizing container is similar.

Since one end side in the longer direction of the short exhaust heat utilizing container is on the boiler disposition side and the muffler and the heat exchanger are disposed on the other end side in the longer direction with respect to the reference surface, an exhaust gas outlet port on the engine side provided on an upper wall in a center part of the long generator container and an exhaust gas inlet port of the muffler positioned on the other end side in the longer direction of the short exhaust heat utilizing container may be adjacently positioned with a short distance in the shorter direction, and since units inside both the containers are assembled on the basis of the common reference surface, respective positioning accuracies of the exhaust gas outlet and inlet pipes are excellent and coupling pipes may be accurately assembled.

Therefore, according to the present invention, it is preferable to configure so that, in the generator container, a liquid cooled engine is arranged roughly in a center position in the longer direction of the container, one or a plurality of radiators are arranged on the reference surface side on one side in the longer direction of the container across the engine, a generator is arranged on the other side (hereinafter, referred to as the 40 f side) in the longer direction of the container, and an engine exhaust gas outlet port is provided roughly in a center part of the container immediately above the engine, on the other hand, in the exhaust heat utilizing container, the reference surface is on the boiler disposition side, and on the other end side far from the reference surface in the longer direction, the muffler that is arranged in an erected position in a height direction of the container and the heat exchanger that generates hot water by exchanging heat with the cooling water heated by the engine are disposed, and the exhaust gas outlet port on the engine side provided on the upper wall in the center part of the generator container and the exhaust gas inlet port of the muffler provided on an upper surface on the other end side in the longer direction of the exhaust heat utilizing container are included. Here, examples of the liquid cooled engine are a watercooled engine and an oilcooled engine.

Particularly, according to the present invention, by providing an opening and closing door on a shorter wall on the opposite side of the reference surface, much smoother assembly and maintenance may be carried out. For instance, by opening the opening and closing door on the control panel side, the generator may be easily controlled.

According to the present invention, the radiator is extendedly arranged on a longer wall (hereinafter, referred to as the opposite wall) on the opposite side of the facing wall along the opposite wall.

According to the present invention, when the radiator is arranged on the opposite side of the facing wall of the container, by arranging a cooling fan between the radiator and the facing wall, the radiator may be effectively cooled and some room may be created in a pipe space of the heated cooling water to be introduced to the short exhaust heat utilizing container side, which enables an efficient pipe layout.

Advantageous Effects

It is required to save space by adjacently arranging a monogeneration container in which the engine and the radiator are accommodated and a cogeneration container in which the boiler and the heat exchanger for collecting the heat thereof in parallel in the longer direction, to accurately couple a pipe for transferring the heat (the exhaust gas heat and the heated engine cooling water) on the monogeneration container side to a heat receiving part side (the boiler and the heat exchanger) on the cogeneration container side, to have a coupling pipe for coupling between both the containers, since the muffler that is a silencer of the exhaust gas of the engine is also accommodated on the exhaust heat utilizing container side having a cogeneration function, and to securely maintain coupling tolerances for accurately coupling both the pipes.

However, the long generator container having the monogeneration function and the exhaust heat utilizing container having the cogeneration function are assembled in separate places, and not only variations in assembly positions of the units and the pipes occur but also, since the facing surfaces of both the containers are extended in the longer direction of the containers and coupling positions with pipes are in the shorter direction perpendicular to the longer direction of the containers, not only coupling of both the pipes but also assembling of the various units may not be accurately carried out.

Therefore, the present invention may provide a container unit type cogeneration-using engine generator device capable of accurately coupling pipe systems between a long generator container and a short exhaust heat utilizing container, even when a basic container configuration is the long generator container in which a power generation function part is accommodated and, as an option, the long generator container and the short exhaust heat utilizing container that is shorter than the long generator container are separately manufactured.

BRIEF DESCRIPTION OF DRAWINGS

FIGS. 2(A) to 2(D) are 2 of the hexahedral view of the short exhaust heat utilizing container. 2(A) is a front view. 2(B) is a rear view. 2(C) is a left side view. 2(D) is a right side view.

DETAILED DESCRIPTION

Preferable embodiments of the present invention will now be described in detail with reference to the accompanying drawings. It is intended, however, that unless particularly specified, dimensions, shapes, relative positions, and the like of components described in the embodiments shall be interpreted as illustrative only and not limitative of the scope of the present invention.

First, a short exhaust heat utilizing container that functions as a cogeneration container used for an embodiment of the present invention is described with reference to FIGS. 1(A) and (B), and FIGS. 2(A) to 2(D).

A short exhaust heat utilizing container 1 has a rectangular shape, whose sizes are standardized. According to an ISO standard, a container length is 20 f (6 m), a container width is 8 f (2.4 m), and a height is 8.6 f (2.6 m).

Figure 1A:
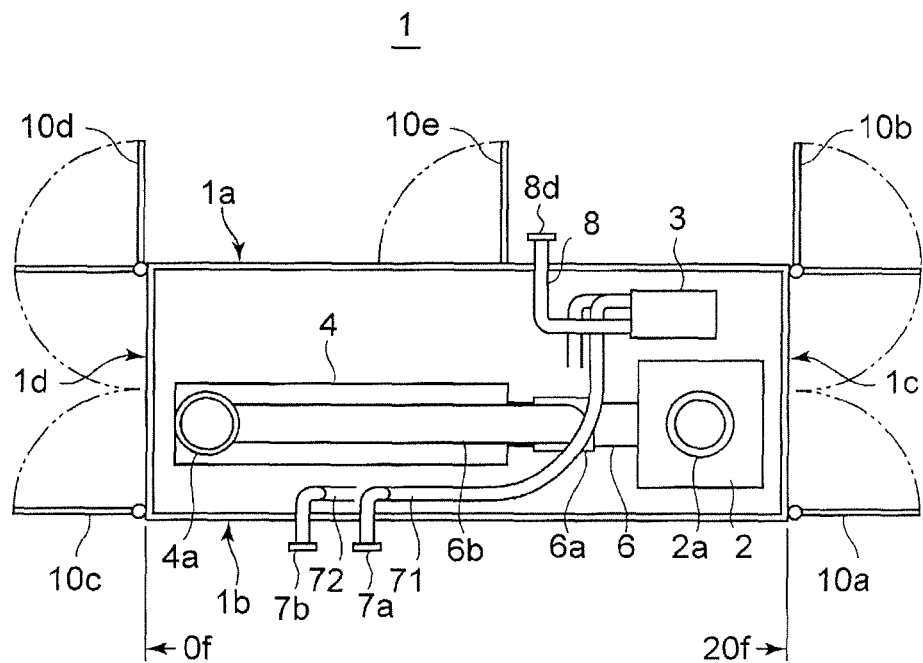
FIGS. 1(A) and 1(B) are 1 of a hexahedral view of a short exhaust heat utilizing container used for an embodiment of the present invention in which an exhaust heat utilizing apparatus is accommodated. 1(A) is a plan view illustrating an internal configuration. 1(B) is a perspective view viewed from a front oblique right direction.
Figure 1B:
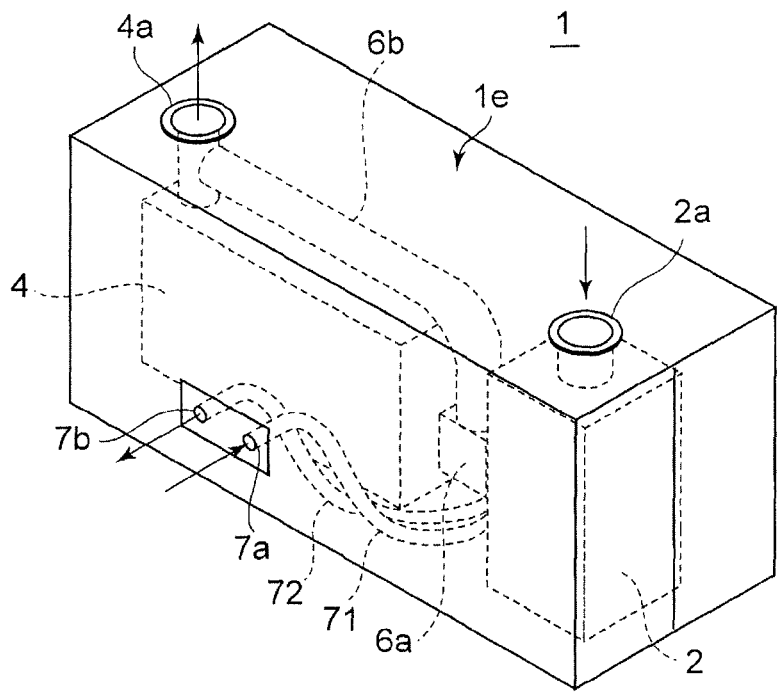

In the exhaust heat utilizing container 1 of such a size, each wall of four sides is specified on the basis of FIG. 1(A).

A longer wall positioned on a bottom side in the drawing is denoted as a front longer wall 1a, a longer wall on the opposite side facing the front longer wall 1a is denoted as a rear longer wall 1b, a shorter wall positioned on one side in the longer direction of the container on the left side of the front longer wall 1a is denoted as a 20 f side shorter wall 1c, a shorter wall facing the 20 f side shorter wall is denoted as a 0 f side shorter wall 1d, and an upper wall is denoted as 1e.

On the respective shorter walls 1c, 1d, double hinged doors 10a/10b, 10c/10d each openable in both directions from a center position is provided and is so configured that each unit accommodated inside may be taken out or remounted. The double hinged doors are so configured that the front longer wall 10a, 10c (1a) side is openable by 90°, and the rear longer wall 10b, 10c (1b) side is openable by 180°, and in a center part of the rear side longer wall 1b, a one side opening and closing door 10e is provided, by opening the double hinged doors 10a/10b, 10c/10d provided on both the shorter walls 1c, 1d, maintenance of parts where maintenance is not possible such as a longer surface of a boiler 4 and supply pipes of a supply hot water pipe and a heated cooling water pipe coupled to the heat exchanger is also easy.

The reason why the double hinged doors 10a, 10c on the front longer wall 1a side are set to be openable by 90° is because the front longer wall 1a neighbors a long generator container 20.

In a 20 f side container space surrounded by the front longer wall 1a and the rear longer wall 1b on a shorter wall side of the 20 f container, a muffler 2 that neighbors the front longer wall 1a side and attenuates sound of an exhaust noise by taking in an exhaust gas of an engine 21 is disposed in an erected position, an exhaust gas inlet port 2a of the muffler 2 is coupled to an upper wall of the container. A heat exchanger 3 that generates hot water by heat exchange with cooling water heated by the engine 21 is disposed side by side with the muffler 2 along the shorter wall on the rear longer wall 1b side in a shorter width direction of the container.

On the other hand, the boiler 4 that takes in the exhaust gas whose sound is attenuated by the muffler 2 and generates steam is extendedly arranged along the front longer wall 1a. The exhaust gas after heat is exchanged by the boiler 4 is introduced to an exhaust gas outlet port that is erected along the 0 f shorter wall, and the outlet port is coupled to the upper wall of the container. Thereby, sound of the exhaust gas whose sound is attenuated by the muffler 2 may be further attenuated by the boiler 4. Therefore, even when a container associated with the present invention is installed outdoors, it becomes possible to suppress a noise to a surrounding to the minimum.

The muffler 2 and the boiler 4 are coupled with a coupling pipe 6 that feeds the exhaust gas to the boiler 4. A damper 6a intervenes in the coupling pipe 6. A bypass pipe 6b that bypasses exhaust gas sorted by the damper 6a along an upper wall of the boiler 4 is provided. The bypass pipe 6 is coupled to an exhaust gas outlet port 4a.

A 9 is a signal detection pipe that sends signals for damper opening control such as steam pressure and temperature signals inside the boiler 4 through a detection port 9a to the long generator container side.

On the other hand, of the heat exchanger 3 neighboring the rear longer wall 1b, an inlet port 7a of an inlet pipe 7 that introduces cooling water heated by the engine 21 and a return port 7b of a return pipe that returns the heated cooling water and cooling water after heat exchange to the engine 21 side are provided to be closely arranged on the 20 f shorter wall 1c side.

An inlet pipe 71 that introduces clear water to the heat exchanger 3 and a supply pipe 72 that supplies a loaded side with hot water generated by the heat exchanger 3 are introduced to the front side longer wall 1a by passing under the coupling pipe 6 in a space between the muffler 2 and the boiler 4. A hot water supply port 8a and a clear water inlet port 8b are provided on the longer wall 1a.

Figure 3:
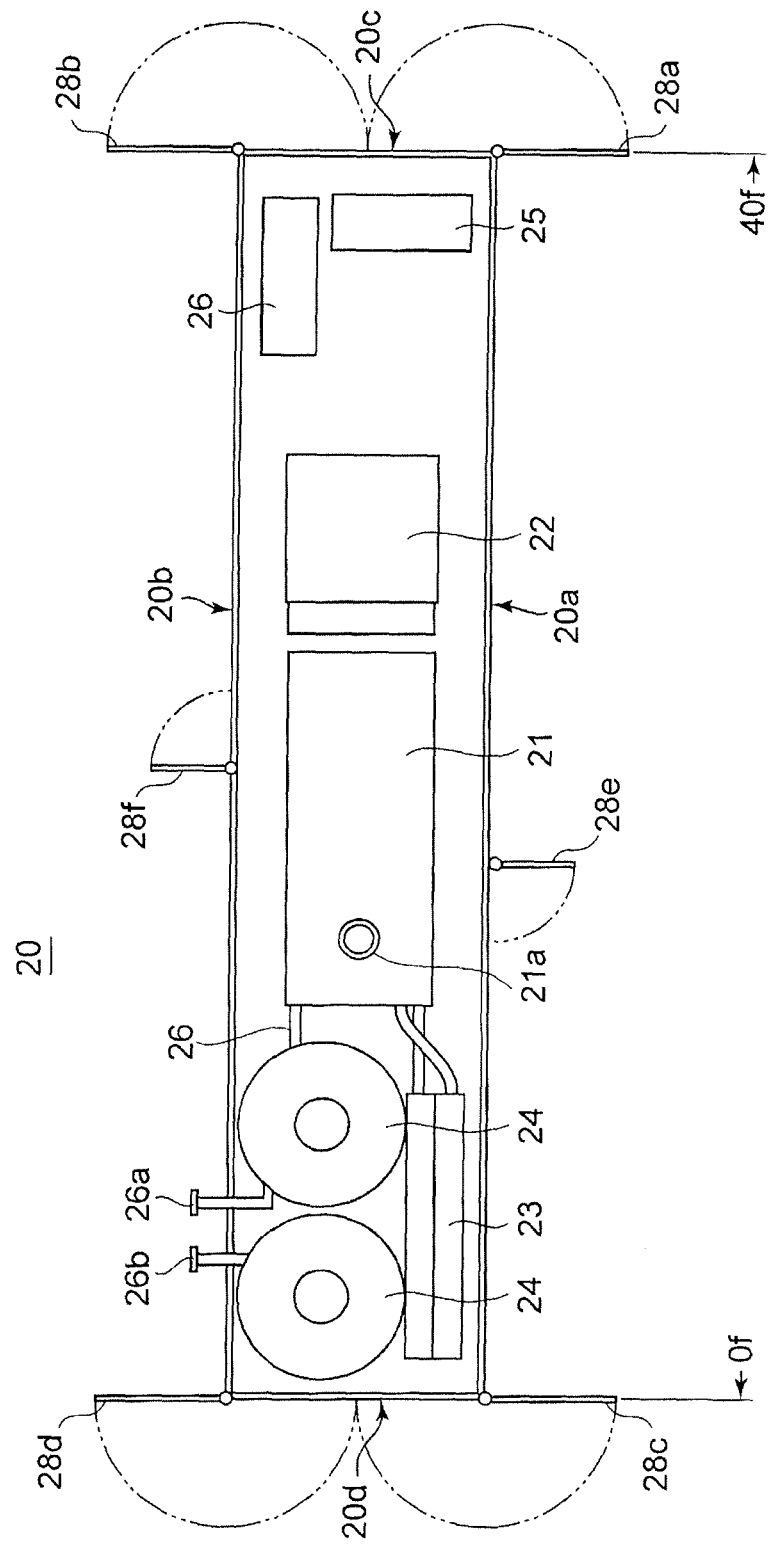
FIG. 3 is a plan view illustrating an internal configuration of a long generator container in which a power generation function part including an engine, a radiator, and a generator is accommodated.
Figure 4:
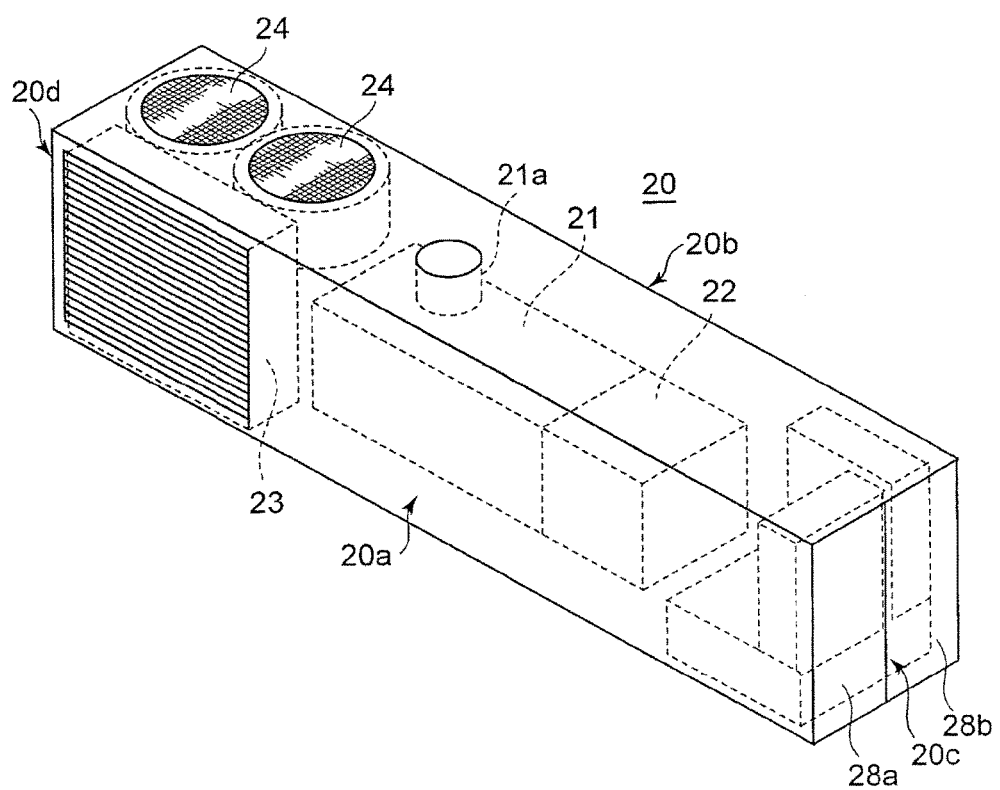
FIG. 4 is a perspective view of the long container of FIG. 3 viewed from the front side.
Figure 5:
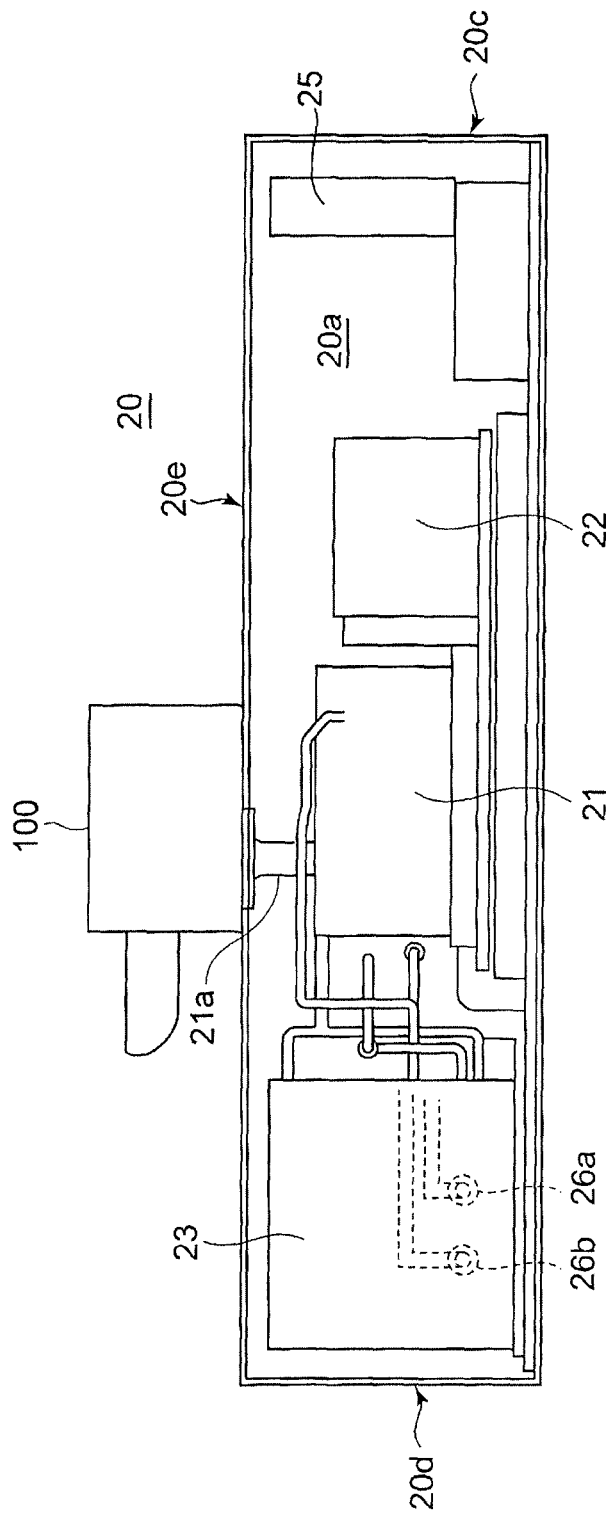
FIG. 5 is a front view illustrating the internal configuration of the long container of FIG. 3.

Next, a long generator container that functions as a monogeneration container used for embodiments of the present invention disclosed in FIG. 3 to FIG. 5 is described.

The generator container 20 has a rectangular shape, whose sizes are standardized. According to an ISO standard, a container length is 40 f (12 m), a container width is 8 f (2.4 m), and a height is 8.6 f (2.6 m).

In the generator container 20 of such a size, each wall of four sides is specified on the basis of FIG. 3. A longer wall positioned on a right side in the drawing is denoted as a front longer wall 20, a longer wall facing the front longer wall on the left side (the opposite side) in the drawing is denoted as a rear longer wall 20b, a shorter wall positioned on one side in the longer direction of the container on the lower side of the front longer wall 20a is denoted as a 40 f side shorter wall 20c, a shorter wall facing the 40 f side shorter wall is denoted as a 0 f side shorter wall 20d, and an upper wall is denoted as 20e.

On the respective shorter walls 20c, 20d, double hinged doors 28a/28b, 28c/28d each openable from a center position are provided to be so configured that each unit (an engine 22, a generator 22, a radiator, controller, and such) accommodated inside may be taken out or remounted. Any door of the double hinged doors 28a/28b, 28c/28d on the front longer wall side or the rear longer wall 20b side is so configured as to be openable by 180°.

Different from the short exhaust heat utilizing container 1, the reason why any double hinged door 28a/28b, 28c/28d is configured to be openable by 180° is because the adjacent container (the short exhaust heat utilizing container 1) is not blocking when the door is opened. By respectively providing one sided opening and closing door 28e, 28f on both longer walls in the center part of the longer walls, maintainability of the engine 21 becomes easier.

An exhaust gas exhaust port 21a of the engine 21 is provided near a center of the upper wall of the container facing the engine 21, preferably, at a position decentered to the 0 f side from the 20 f position. A 101 is a silencer provided on an upper wall 20e of the container by way of an L-shaped pipe and is mounted when a monogeneration configuration is formed without using a short exhaust heat utilizing container.

The center of gravity of the engine 21 is positioned and arranged at roughly a center position in the longer direction of an internal space inside the long generator container 20, preferably, in a range of 20 f±10 f on both sides in the longer direction of the 20 f position that is a center position of the 40 f. Thus, the engine 21 with a large weight load is arranged at the center position in the longer direction of the long generator container 20, and a plurality of rows of radiators 23 in an accommodation space on the 0 f side across the engine 21 are arranged near the front longer wall 20a side in series with respect to the engine 21.

A configuration is so formed that two cooling fans 24, 24 are arranged in an accommodation space between the plurality of rows of radiators 23 and the rear side longer wall, and a cooling wind is attracted and introduced to the radiators 23.

At the rear longer wall 20b surface on a side facing the radiators 23, a discharge port 26a that introduces the heated cooling water of the engine 21 to the heat exchanger 3 and a return port 26b of the cooling water are provided, and the cooling water pipe 26 couples between the radiators 23 and the engine 21.

While high cooling properties are particularly required in a closed container, by arranging the radiator 23 closely along the front longer wall 20a side and the discharge port 26a and the heated cooling water return port 26b thereof are collectively arranged at the rear longer wall 20b, it becomes possible to arrange the radiator largely and secure high cooling properties.

A configuration is so made that the shorter walls 20c, 20d on both end sides in the longer direction are entirely openable with the double hinged doors 28a/28b, 28c/28d, and the engine 21 and the generator 22 may be taken out, and the control panel 25 is arranged on the far side of the double hinged door 28a/28b on the generator 22 side (the 40 f side).

In other words, a configuration is so made that the generator 22 is adjacently arranged on the other side (the 40 f side) in the longer direction of the engine 21, and, by axis-coupling the both, a driving force of the engine 21 may be transmitted to the generator 22.

In a space between the generator 22 and the 40 f shorter wall, the control panel 25 is disposed by facing the double hinged door 28a/28b and a lubricating oil tank 26 is disposed at a side part thereof.

Next, a preferable layout configuration of the present invention constituting a cogeneration container unit by effectively combining the long generator container 20 and the short exhaust heat utilizing container 1 is described with reference to FIG. 6 and FIG. 7.

Figure 6:
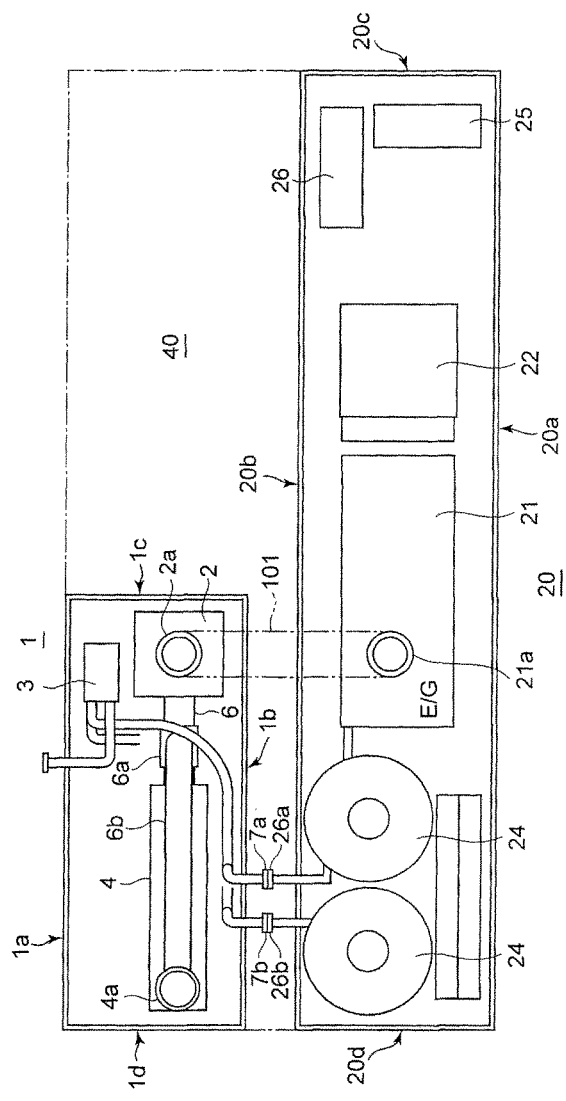
FIG. 6 is a view illustrating a container unit type cogeneration-using engine generator device associated with an embodiment of the present invention in which the short exhaust heat utilizing container and the long generator container are coupled in a preferable arrangement, specifically, is a container unit plan view illustrating an internal configuration.
Figure 7:
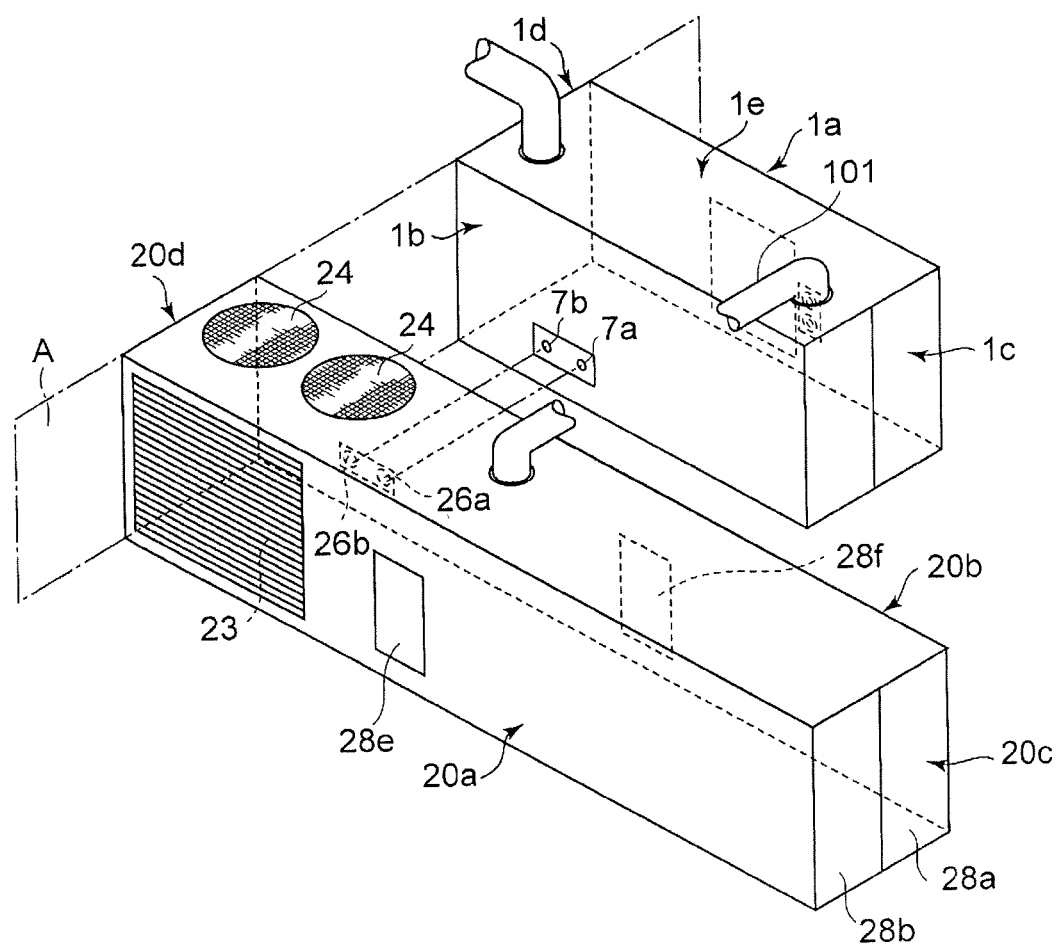
FIG. 7 is a perspective view illustrating the container unit of FIG. 6.

According to the present embodiment, since the generator container 20 for a generator function and the short exhaust heat utilizing container 1 constitute a combination unit by being arranged in parallel in the longer direction by making both the longer walls to face each other, and the radiators 23 are extendedly arranged along the front side longer wall by neighboring the front side longer wall on the opposite side of the rear side longer wall facing the short exhaust heat utilizing container 1, as illustrated in FIG. 6 and FIG. 7, the longer direction of the container installation space has a length of 40 f (12 m) the same as the long container, and the shorter direction has a length of 8 f×2 (16 f (4.8 m)), and, as a result, a laying space 40 that is a rectangular occupying space becomes relatively small.

According to the present embodiment, since the heat exchanger 3 that generates hot water for hot-water supply by heat exchange with heated cooling water exhausted from the engine 21 is arranged side by side with the muffler 2 or arranged in a space between the muffler 2 and the boiler 4, and at respective facing walls 20b/1b where the long generator container 20 and the short exhaust heat utilizing container 1 face each other, water inlet ports 26a/7a that introduce cooling water heated by the engine 21 is introduced to the heat exchanger 3 and return ports 26b/7b of cooling water whose heat is absorbed by the heat exchanger 3 are respectively provided, the cooling water outlet port 26a on the long generator container 20 side and the cooling water inlet port 7a on the short exhaust heat utilizing container side are coupled by way of a coupling pipe, and since both the cooling water return ports, namely, the cooling water return port 7b on the short exhaust heat utilizing container 1 side and the cooling water return port 26b on the generator container 20 side face each other, there is no concern about the pipes being routed outside. The coupling pipes 32, 32 may be configured by quick coupling.

According to the present embodiment, since the shorter walls of the containers positioned on both the end side in the longer direction of the generator container 20 and the exhaust heat utilizing container are respectively formed with openable opening and closing doors 10a to 10d and both longer walls of both the container 1, 20 face each other, both shorter walls positioned on both sides in the longer direction of the respective containers 1, 20 become open. Therefore, when the openable opening and closing doors 10a to 10d are provided at both the shorter walls, assembly and taking-out and maintenance after the taking-out of each unit accommodated inside the respective containers along the longer direction are made easy.

Particularly, since the short exhaust heat utilizing container 1 is configured by arranging side by side the heat exchanger 3 and the muffler 2 in the shorter width direction and what are arranged in series in the longer direction are only the boiler 4 and the muffler 2, the container never becomes long.

Figure 8:
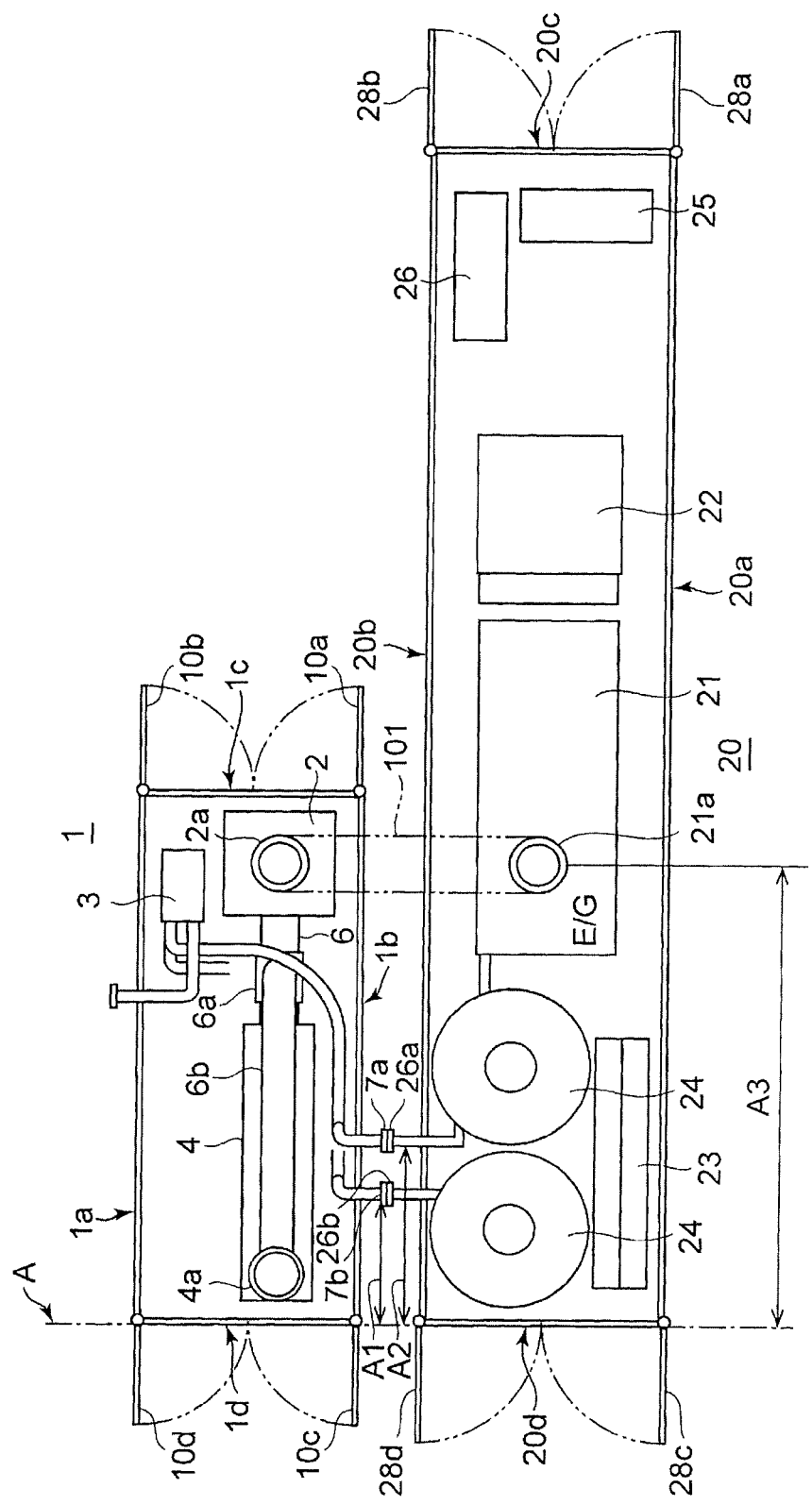
FIG. 8 is a view illustrating a container unit type cogeneration-using engine generator device associated with an embodiment of the present invention in which the short exhaust heat utilizing container and the long generator container of the present invention are coupled in a preferable arrangement, specifically, is a container unit plan view illustrating an internal configuration.

Next, an outline of the present invention is described with reference to FIG. 8. The present invention is composed of the long generator container 20 in which generator functional components including the radiator 23, the engine 21, and the generator 22 are accommodated and arranged in series along the longer direction of the container, and the short exhaust heat utilizing container 1 formed by arranging the boiler 4 along the longer direction of the container and arranging side by side on both sides in the shorter direction on the far side the muffler 2 that attenuates a sound of the exhaust gas and the heat exchanger 3 that generates hot water by exchanging heat with heated cooling water of the engine.

The configuration is so made that the shorter walls 20d, 1d on one end side in the longer direction of both the containers 1, 20 are set to be the reference surface A so as to be respectively positioned on the same straight line, a container unit is configured by making the reference surface A to be a reference, by making both longer walls of the long container 20 and the short exhaust heat utilizing container 1 to face each other, and by arranging and combining in parallel in the longer direction the respective containers across the facing walls 1b/20b, and both the containers 1, 20 are coupled along the shorter direction of the containers with the plurality of pipes 7a/26a, 7b/26b across the facing walls 1b/20b in parallel to which both the containers are arranged.

According to the invention described above, since, by making the 0 f surface that is the short walls on one end side in the longer direction to be the reference surface A, the short exhaust heat utilizing container and the long generator container are brought in contact with the reference surface, in the long generator container, not only dispose positioning 7b/26b of the heated cooling water outlet and return pipes from the engine but also positioning of various pipes from the radiator are uniquely determined by distances from the reference surface provided on the 0 f side. In other words, since the pipes may be provided perpendicularly to the shorter direction, setting distances in rigorous tolerances becomes easy.

Similarly, in the short exhaust heat utilizing container 1, positioning of an inlet port and a return port of heated cooling water on the boiler side that are coupled to the heated cooling water outlet and return pipes is uniquely determined by distances from the reference surface provided on the 0 f side. In other words, since the pipes may be provided perpendicularly to the shorter direction, setting distances in rigorous tolerances becomes easy.

Since both the 0 f shorter wall of the long generator container and the 0 f shorter wall of the short exhaust heat utilizing container constitute the common linear reference surface A, axis lines of the heated cooling water outlet port 26a on the engine side on the 40 f side, the cooling water inlet port 7a on the 20 f side, and the return pipes 7b/26b of the respective containers are all constitute axis lines parallel to the reference surface (lines parallel to the shorter direction perpendicular to the longer direction), coupling of pipes between both the containers become easy.

By collectively disposing the respective outlet ports and inlet ports at one place, workability is improved.

In other words, since distances A1, A2, A3 of dispose positions of pipes of both the containers from the reference surface A may be made to coincide for the long generator container and the short exhaust heat utilizing container, and tolerances are rigorously set, even when both the containers are coupled with a plurality of pipes along the shorter direction of the containers across the facing walls of both the containers, the coupling may be accurately performed.

The reason why the reference surface A is set at shorter walls of the container walls is because the containers are of sizes specified by ISO and are formed by standard sizes of the other end side of the shorter walls of the containers.

Therefore, since the reference surface is always rigorously positioned at the 0 f and, on the other hand, length sizes of the other end sides of the reference surface are specified as 20 f, 40 f, as long as the longer direction of the containers is concerned, either of 40 f end side and 20 f end side is at a position with high tolerance accuracy.

Therefore, by configuring to be composed of a long generator container in which the radiator 23, engine 21, generator 22, and the control panel 25 of the generator are accommodated and arranged in series and a short exhaust heat utilizing container formed by arranging from the reference surface A side a boiler 4 along the longer direction of the container and arranging side by side a muffler 2 and a heat exchanger 3 on both sides in the shorter direction on a far side of the boiler 4, in the long generator container 20, when the radiator and the engine are assembled from the reference surface A on the 0 f side, excellent assembly accuracy from the reference surface in the longer direction may be maintained, and since, both on the 40 f side and the 20 f side on the opposite side of the reference surface A, dimensions are accurately regulated by the containers, the generator 22 and the control 25 sides may be accurately assembled.

The short exhaust heat utilizing container is so configured that a reference surface A side thereof is a boiler disposition side, by disposing the muffler and the heat exchanger on the opposite wall side with respect to the reference surface A, an exhaust gas outlet port on the engine side provided at an upper wall in a center part of the long generator container and an exhaust gas inlet port of the muffler positioned on the other end side in the longer direction of the short exhaust heat utilizing container may be closely neighbored in the shorter direction, and since units inside both the containers are assembled on the basis of the common reference surface, respective positioning accuracies of the exhaust gas outlet and the inlet pipe are so excellent that the coupling pipes at be accurately assembled.

Particularly, according to the present invention, by providing a shorter wall on the opposite side of the reference surface A with opening and closing doors 10a, 10b, 20a, 20b, much smoother assembly and maintenance are possible. For instance, by opening the opening and closing door on a control panel 25 side, the generator is easily controlled.

According to the present invention, when the radiator 23 is extendedly arranged by neighboring an opposite wall on an opposite side of the facing wall 20b along the opposite wall 20a and the radiator is arranged on the opposite side of the facing wall of the container, by arranging a cooling fan between the radiator and the facing wall, the radiator 23 may be effectively cooled while preventing heat from the short exhaust heat utilizing container from being conducted to the radiator side, and a room may be produced in a pipe space of cooling water introduced to the short exhaust heat utilizing container side and an efficient pipe layout is possible.

INDUSTRIAL APPLICABILITY

The present invention is to provide a container unit type cogeneration-using engine generator device, while making a long generator container in which a power generation function part is accommodated to be a monogeneration container, capable of, as an option, when exhaust heat utilizing containers that are shorter than the long generator container are individually manufactured as cogeneration containers, accurately coupling pipe systems of both containers.

REFERENCE SIGNS LIST 1 20 f container
2 Muffler
2a Exhaust gas inlet port of muffler
3 Heat exchanger
4 Boiler
7a, 7b Clear water inlet port introduced to heat exchanger and hot water take-out port after heat exchange
8a, 8b Inlet pipe of heated cooling water introduced from engine to heat exchanger and return pipe
20 40 f container
21 Engine
21a Exhaust gas exhaust tool of engine
22 Generator
23 Radiator
A Reference surface

The invention claimed is:
1. An apparatus, comprising:
a generator container accommodating a generator and an engine connected with the generator; and
an exhaust heat utilizing container in which steam or hot water is generated by recovering exhaust heat of the engine,
wherein the generator container includes, at least, a first longer wall extending along a first direction and a first shorter wall extending from one end of the first longer wall along a second direction orthogonal to the first direction,
the exhaust heat utilizing container includes, at least, a first longer wall extending along the first direction and a first shorter wall extending from one end of the first shorter wall along the second direction,
the first longer wall of the generator container faces parallel to the first longer wall of the exhaust heat utilizing container, and the first longer wall of the generator container and the first longer wall of the exhaust heat utilizing container are connected by a plurality of pipes, the plurality of pipes comprising a first pipe to transport water to recover exhaust heat from the engine, a second pipe to transport water to the engine, and an exhaust gas port to transport exhaust gas from the engine.

2. The apparatus according to claim 1,
wherein the first shorter wall of the generator container and the first shorter wall of the exhaust heat utilizing container are positioned on a same straight line.

3. The apparatus according to claim 1,
wherein a size of the generator container comprises a dimension of approximately 12.0 meters, and
a size of the exhaust heat utilizing container comprises a dimension of approximately 6.0 meters.

4. The apparatus according to claim 3,
wherein the generator container accommodates a heat exchanger configured to generate the hot water by heat-exchanging with cooling water heated by the engine,
a cooling water outlet port discharging the cooling water heated by the engine and a cooling water return port being in order to return the cooling water to the engine are arranged on the first longer wall of the generator container,
a cooling water inlet port introducing the cooling water to the heat exchanger and a cooling water take-out port being in order to return the cooling water to the generator container are arranged on the first longer wall of the exhaust heat utilizing container,
a first axis line connecting the cooling water outlet port and the cooling water inlet port extends along the second direction, and
a second axis line connecting the cooling water return port and the cooling water take-out port extends along the second direction.

5. The apparatus according to claim 1,
wherein the exhaust heat utilizing container accommodates a muffler erected vertically in a height direction of the exhaust heat utilizing container and a boiler generating the steam by heat-exchanging with exhaust gas from the engine,
the exhaust gas port is arranged on an upper wall of the generator container above the engine,
an exhaust gas inlet port is arranged on an upper wall of the exhaust heat utilizing container above the muffler, and
a third axis line connecting the exhaust gas port and the exhaust gas inlet port extends along the second direction.

6. The apparatus according to claim 1,
wherein the generator container includes a second shorter wall extending from the other end of the first longer wall along the second direction,
the exhaust heat utilizing container includes a second shorter wall extending from the other end of the first longer wall along the second direction,
a first opening and closing door is provided on the second shorter wall of the generator container, and
a second opening and closing door is provided on the second shorter wall of the exhaust heat utilizing container.

* * * * *